Jan. 21, 1930. S. GREBEL 1,744,222
PROJECTOR
Filed May 21, 1928 4 Sheets-Sheet 1

Stephen Grebel
Inventor
by Louis Barnett
Attorney.

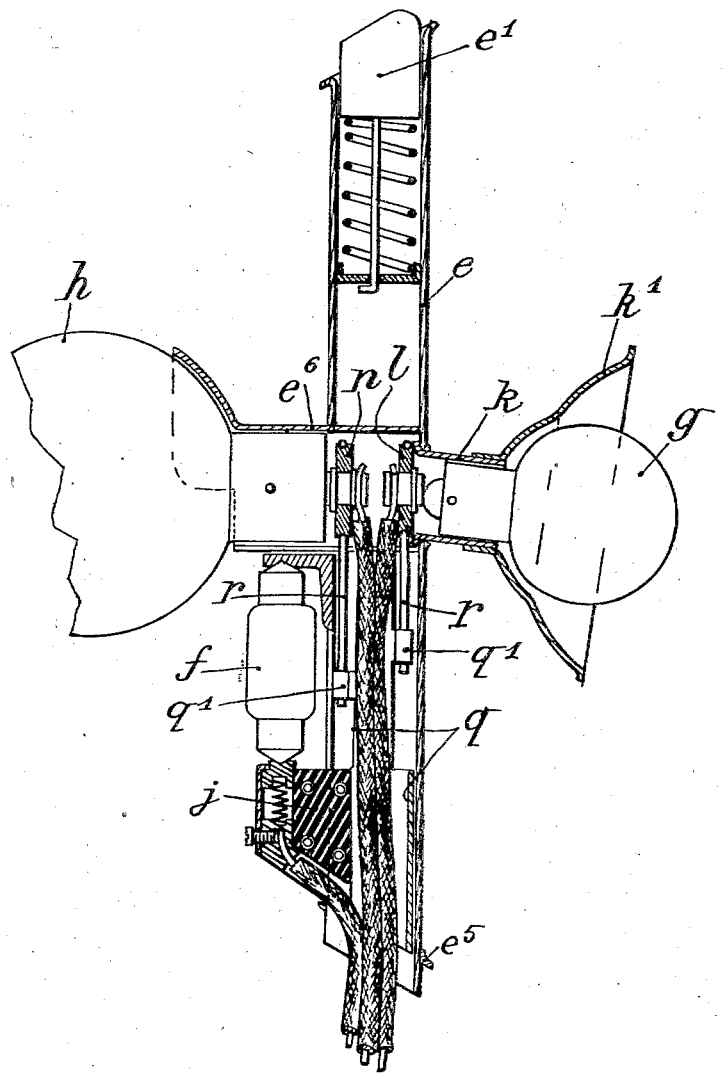

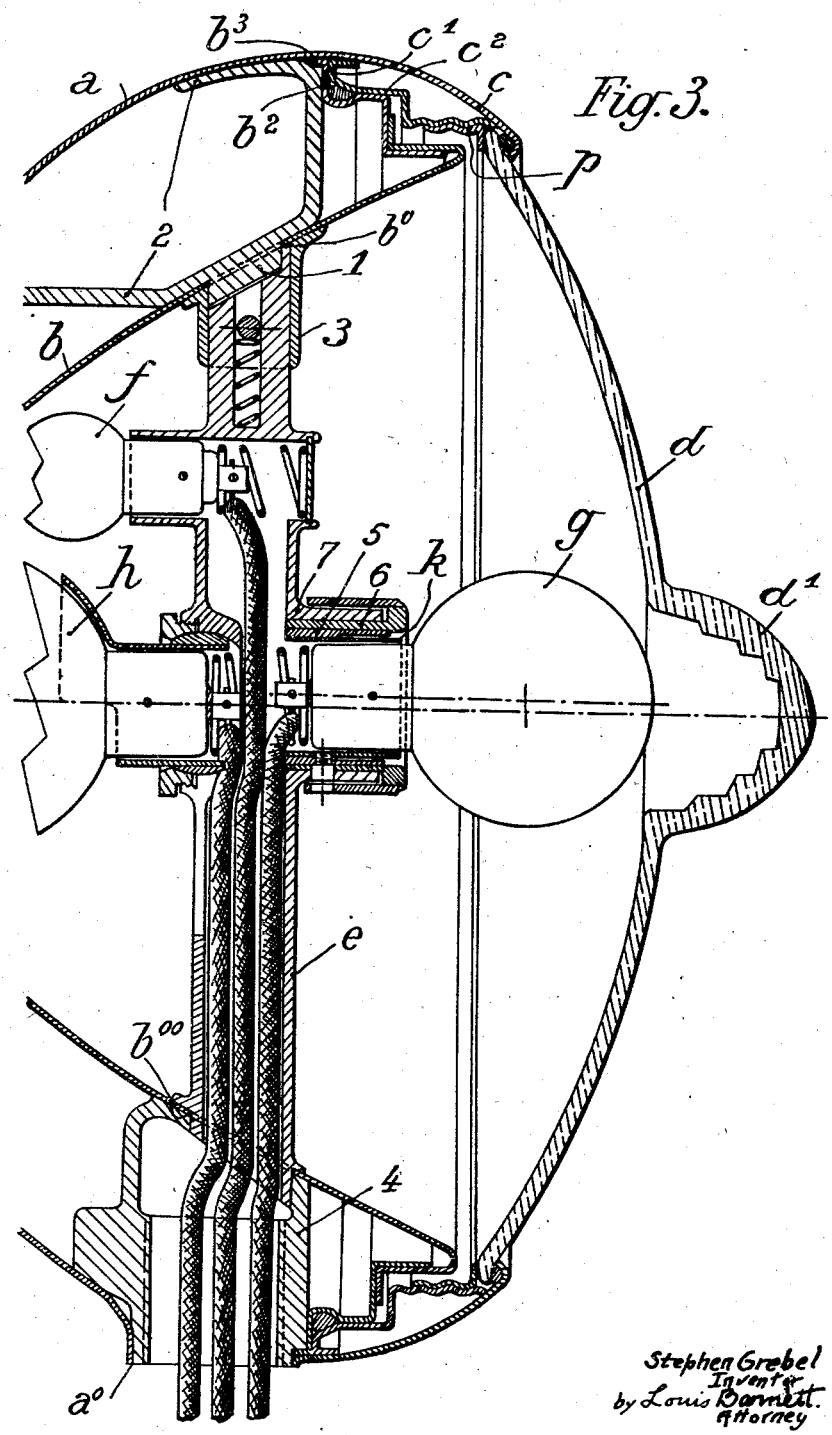

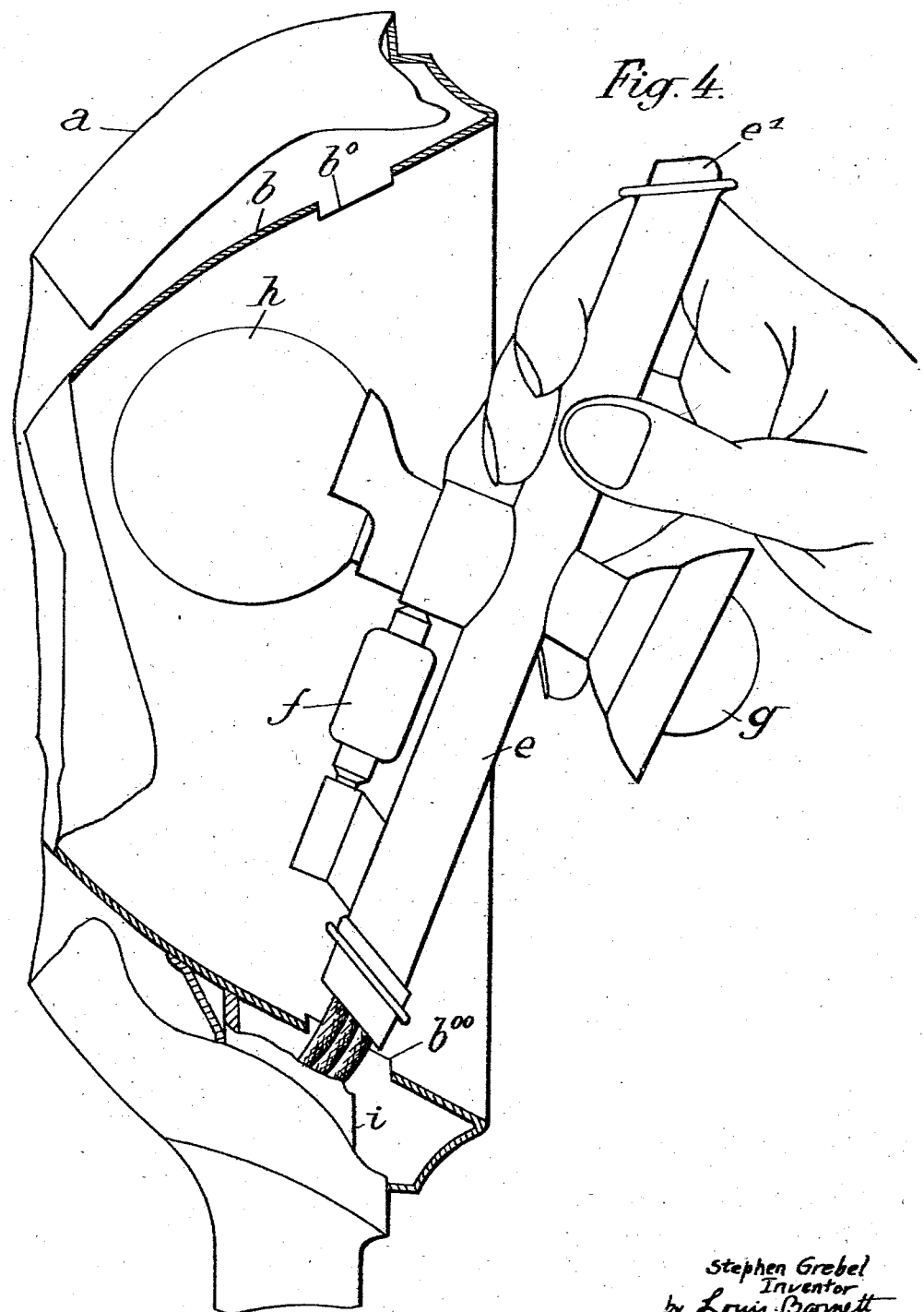

Patented Jan. 21, 1930

1,744,222

UNITED STATES PATENT OFFICE

STEPHEN GREBEL, OF PARIS, FRANCE

PROJECTOR

Application filed May 21, 1928, Serial No. 279,340, and in Belgium May 25, 1927.

The present invention relates to luminous projectors.

One of the objects of the invention, is to provide means for mounting a lamp in a projector whereby the latter may be removed or replaced with greater ease than heretofore.

Another object is to provide a special mounting for a lamp in a projector intended to have an adjustable luminosity.

Still another object is to provide means for varying the direction of the light beam emitted by the projector.

Additional objects will appear in the course of the detailed description now to be given with reference to the accompanying drawings, in which:—

Fig. 2 is a section through a lamp mounting differing from the one shown in Fig. 1;

Fig. 3 is a section through still another form of projector;

Fig. 4 shows, diagrammatically, the manner in which the lamp support is to be mounted in the projector.

Figure 1:
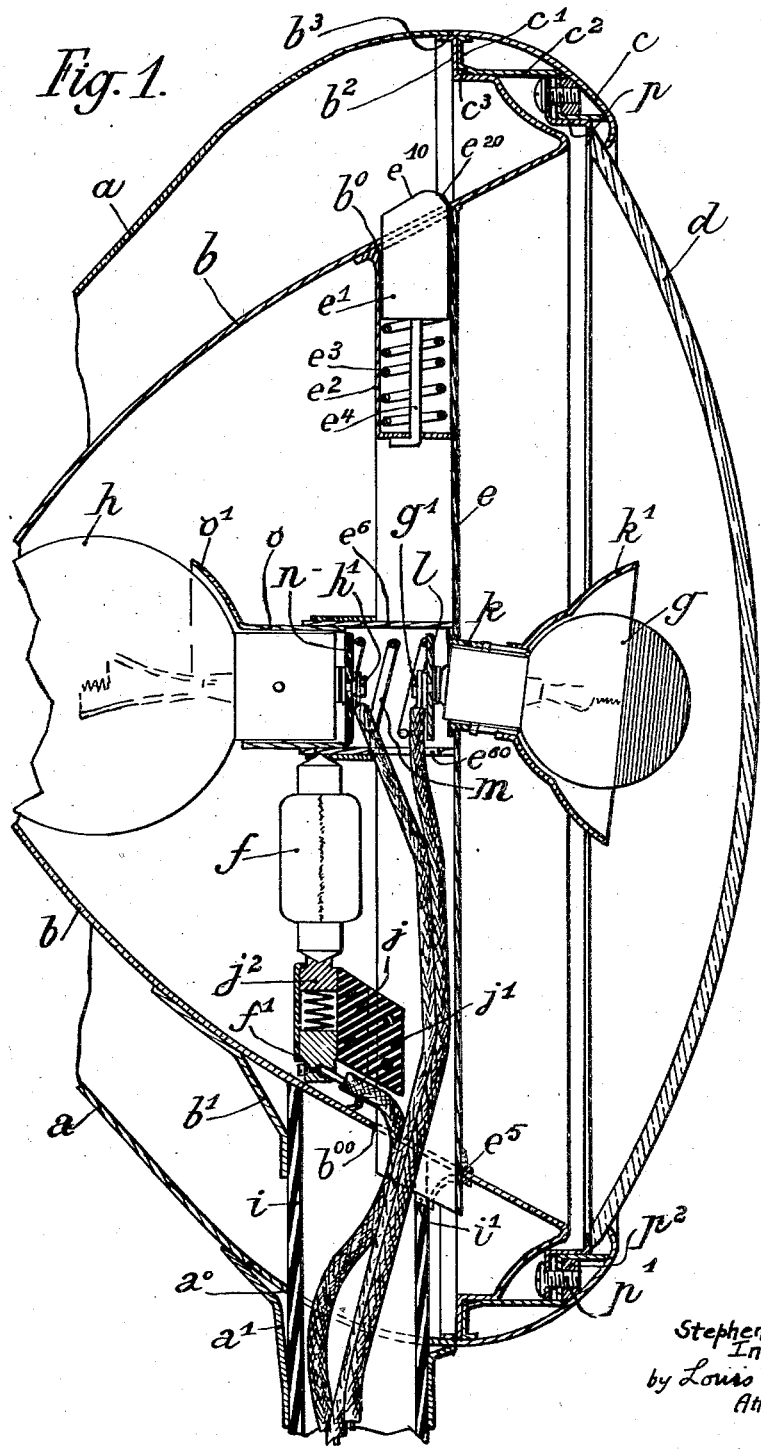
Fig. 1 is a vertical section through one illustrative embodiment of the invention.

The lamp mounting hereinafter to be described consists of a single support fitted with (1) a lamp designated "police", (2) a lamp for reduced illumination to be called a "code" lamp and (3) a lamp for high power illumination, to be referred to as a "road" lamp.

Referring to Fig. 1 of the drawings, $a$ represents the exterior shell of the projector assembly,—$b$, a parabolic reflector,—$c$, a hingedly supported door serving as frame for lens $d$,—$e$, a support for lamps $f$, $g$ and $h$,—$a°$, an opening adapted to receive tube $i$ constituting the "tail" of the projector assembly,—$a^1$, a union adapted to be brazed or otherwise connected to tube $i$ and aligned with opening $a°$,—$b^2$ an abutment for fixing the position of reflector $b$,—$c^1$, a counter-abutment for $b^2$, integral with a spacing-element $c^2$,—and $b^3$ a flange adapted to coact with shell $a$.

Before mounting reflector $b$ inside the shell, a tube $b^1$ is soldered thereto in order to provide a support and guide for tube $i$. Reflector $b$ may be soldered to casing shell $a$ or connected thereto in any other manner desired. Tube $i$, provided with a notch $i^1$, is inserted in the direction $a^1$, $a°$, $b^1$ until it abuts against $b$ and is then united to assembly $a$, $b$, by brazing, or soldering or by properly positioned rivets or screws. This completes the projector assembly except for the lamps and their support.

The lamp assembly consists of a bar $e$ whose section is that of U having its free edges bent inwardly and whose length is such as to permit it to about against $b$ in line with an opening $b°$ formed along a generatrix of $b$ at one of its extremities and to extend through a similar opening $b°°$ diametrically opposite $b°$,—a bolt $e^1$ slidably mounted in guide $e^2$ and forced outwardly by spring $e^3$ to a position limited by bent rod $e^4$, the head of said bolt comprising an oblique surface $e^{10}$,—an abutment $e^5$ rigidly connected to $e$ and limiting the penetration of the latter into $b°°$,—a socket support $e^6$ rigidly positioned on $e$ in line with the optic axis of the reflector,—an insulated or insulating terminal support $j$ riveted at $j^1$ to bar $e$,—a small "police" lamp $f$ having one pointed extremity in contact with a small circular orifice formed in socket support $e^6$ and the other in contact with a spring actuated support $j^2$,—a terminal $f^1$ adapted to supply current to lamp $f$,— a socket $k$, loosely mounted on $e$ so that its axis forms an angle with the optic axis of the projector, said socket being provided with a small reflector $k^1$,—an insulating disc $l$ fitted with a contact for "code" lamp $g$ on one side and with a current terminal $g^1$ on the other,— a disc $n$ similar in all respects to $l$ and connected to a cable providing current to "road" lamp $h$ through terminal $h^1$,—and a spring $m$ tending to force discs $l$ and $n$ away from one another. Lamp $h$ is mounted in socket $o$ provided with the usual reflector $o^1$.

The projector assembly is completed by any of the usual devices for fixing lens $d$ in position, or by means of the special device shown in the drawing. Here, elements $c^1$, $c^3$ are designed to fit into close contact with $b$, $b^2$, a slightly relieved portion $c^3$ being provided to correct for any play in the hinges (not shown) supporting door $c$. A ring $p$, connected to $c^2$ by means of screws $p^1$ and annular ring $p^2$, serves to maintain lens $d$ rigidly in position against the free edge of door $c$.

The manner in which a lamp changing operation is effected is practically self-evident from the foregoing description. If surface $e^{20}$ is given the proper curvature, a sharp pull on bar $e$ will liberate upper extremity of the latter and, by providing a proper bevel on the lower end of $e$, the whole lamp supporting assembly may be removed. To put the latter back into place, the lower end of $e$ is inserted into $b^{\circ\circ}$ and force is applied to the upper end so that $e^{10}$ first slides in contact with $b$, then into opening $b^\circ$. It is thus seen that without using any tools whatever, the lamp sockets may be quickly made accessible. A properly sized opening $e^{60}$ should be formed in $e^6$ to permit examination or the repair of any of the elements contained therein.

The device represented in Fig. 2 differs from the one shown in Fig. 1 only in the mode of mounting elements $j$, $l$ and $n$, which are here supported together on a detachable support $q$ by means of a screw or other equivalent element. Spring $m$ being eliminated, in this form of device, its function is fulfilled by a pair of resilient elements $r$ formed of stiff piano cord or the like, supported in clamps $q^1$.

In the modification shown in Fig. 3, bar $e$ is formed of a single casting and is held in place by means of a male element 1, forming part of a casting 2, which enters a recess in the upper extremity of $e$ and is held in place by a spring actuated collar 3 slidably mounted on $e$. It will be noted further that, in this form of device, element $i$ is replaced by casting 4 having a recessed upper portion adapted to coact with the lower end of $e$. Lens $d$ is here held in place by ring $p$ provided with a thread which coacts with a thread formed on $c^2$. Lamp socket $k$ is mounted in a tube 5 which is in turn mounted eccentrically in a collar 6 supported concentrically in shell 7.

What I claim is:—

1. In a projector, a reflector having an opening in a wall thereof, a lamp support having one end adapted to fit into said opening, means for supporting a lamp mounted intermediate the extremities of said support a conductor extending through said opening to said means, and manually operable means for locking the free end of said lamp support in contact with a predetermined portion of a wall of said reflector, said means being also manually operable to release the free end of the lamp support.

2. In a projector, a reflector having an opening in a wall thereof, a lamp supporting bar adapted to extend across said reflector, a lamp socket mounted on said bar intermediate the ends thereof, a conducting cable extending through said opening to said socket, and means operable to lock said bar in position when one end is inserted in said opening and the other end is moved into position to coact with a predetermined portion of the wall of said reflector.

3. In a projector, a reflector having a sloping wall, said wall having an opening formed therethrough, a lamp supporting bar having one end adapted to engage in said opening, a socket mounted on said bar, a cable extending through said opening to said socket, and reciprocatable means mounted on one end of said supporting bar and adapted to lock said bar in engagement with the sloping wall of the reflector chamber, said last named means operating to release said bar when forced towards the interior of the reflector.

STEPHEN GREBEL.